United States Patent Office 3,285,881
Patented Nov. 15, 1966

3,285,881
POLYESTER POLYOLS
Karl Brack, Wilmington, Del., assignor to Hercules Incorporated, a corporation of Delaware
No Drawing. Filed Mar. 25, 1963, Ser. No. 267,817
9 Claims. (Cl. 260—78.4)

This invention relates to new polymers containing a plurality of ester groups and alcohol groups and, more particularly, to polyester polyols obtained by the reaction of cyclic anhydrides and epoxy alcohols.

In accordance with this invention it has been found that the anhydrides of dicarboxylic acids can be reacted with epoxy alcohols to produce new polymers composed of alternating units derived from the cyclic anhydride and the epoxy alcohol. The reaction which takes place may be set forth as

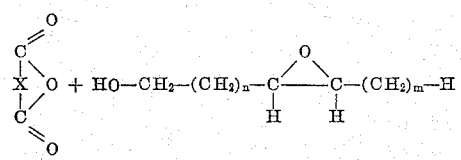

(1)

where X is a divalent organic residue and $n$ and $m$ are whole numbers of from 0 to 10 and which can be alike or different, and the sum of $m+n$ is 7 to 14, to give

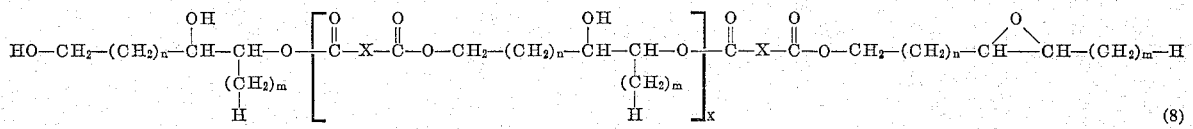

(2)

Since either of the epoxy oxygen-to-carbon bonds can react, polymers containing the isomeric polymer unit

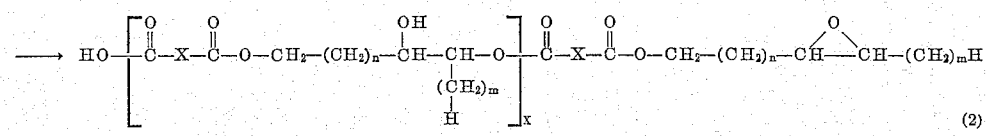

(3)

are also produced as well as polymers containing both types of these isomeric polymer units as, for example,

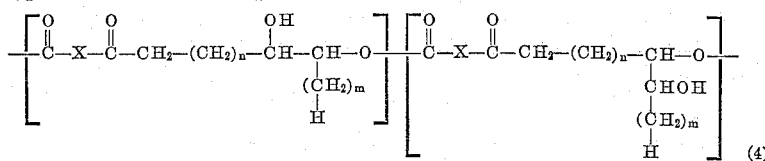

(4)

The reaction is believed to take place in two steps, the first step being a reaction between the primary alcohol group of the epoxy alcohol and the anhydride to yield an epoxyalkyl monoester of the dicarboxylic acid; namely,

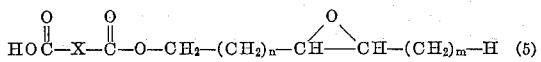 (5)

The free carboxylic acid group then reacts with the epoxy group of a second molecule of the epoxy alcohol to open the epoxy ring:

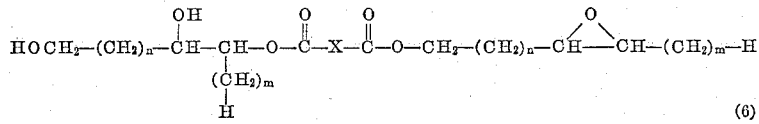

(6)

The primary alcohol group then reacts with another molecule of the anhydride, and the cycle is repeated. Because of the greater activity of the primary alcohol group over that of the secondary alcohol group in (6), the polymer that is produced by this process is essentially linear and not cross-linked as would be the case if the secondary alcohol groups were to react with the anhydride.

The end groups of the polymer molecule will depend on whether an exact 1:1 mole ratio of anhydride to epoxy alcohol is used in preparing the polymer or whether an excess of either reagent is used. Thus, if a 1:1 mole ratio is used, the end groups will as depicted in Formula 2. If, on the other hand, an excess of anhydride is used, both end groups will be acid groups as follows:

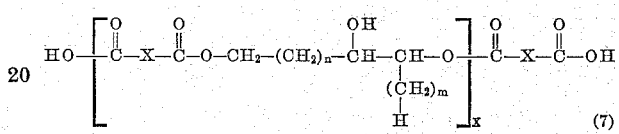

(7)

and, if an excess of epoxy alcohol is used, both ends of the polymer will be epoxy alcohol terminated as follows:

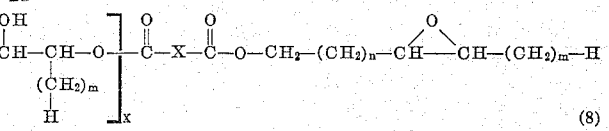

(8)

Accordingly, the new polymers of this invention may be defined as having the formula:

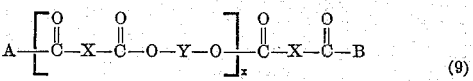

(9)

where A is HO— or

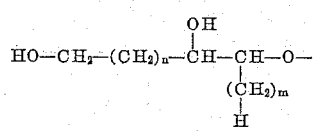

B is —OH or

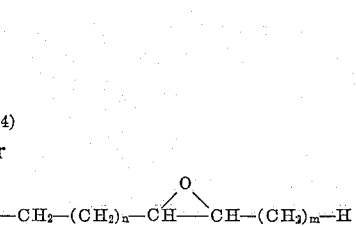

X is a divalent organic residue, Y is

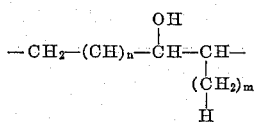

or

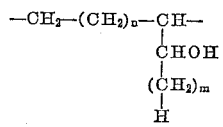

$n$ and $m$ are whole numbers of from 0 to 10 which can be alike or different, and the sum of $m+n$ is 7 to 14; and $x$ is any whole number.

Any cyclic anhydride, i.e. the anhydride of a dicarboxylic acid, can be used to produce the new polymer ester polyols of this invention. These cyclic anhydrides have the general formula:

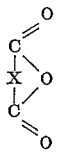

where X is a divalent organic residue inert to the copolymerization reaction. Exemplary of the anhydrides that may be used are maleic anhydride; succinic anhydride; glutaric anhydride; adipic acid anhydride; phthalic anhydride; tetrachlorophthalic anhydride; hexahydrophthalic anhydride; nitrophthalic anhydride; 3(4)-chlorophthalic anhydride; bicyclo-[2.2.1]-5-heptene-2,3-dicarboxylic anhydride; 4-cyclohexene-1,2-dicarboxylic anhydride; 7-oxabicyclo-[2.2.1]-heptane-2,3-dicarboxylic anhydride; 1,4,5,6,7,7-hexachlorobicyclo-[2.2.1]-5-heptane-2,3-dicarboxylic anhydride; etc.

Any aliphatic epoxy alcohol containing at least 10 carbon atoms may be used to prepare the new polyester polyols of this invention. Thus, the epoxy alcohols used will have the general formula:

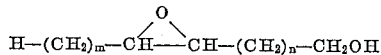

where m and n are whole numbers of from 0 to 10 and which can be alike or different and wherein the sum of $m+n$ is from 7 to 14. Exemplary of these epoxy alcohols are 9,10-epoxydecanol, 10,11-epoxyundecanol, 4,5-epoxytetradecanol, 8,9-epoxyhexadecanol 9,10-epoxyoctadecanol, etc.

The reaction between the epoxy alcohol and the cyclic anhydride to produce the new polyester polyols of this invention is readily carried out by heating a mixture, preferably equimolar amounts or close to equimolar amounts, of the two reagents at a temperature of from about 30° C. to about 200° C. and preferably from about 60° C. to about 120° C. either in bulk or in solution. Any inert organic liquid solvent may be used as the diluent for the reaction. Suitable diluents are benzene, toluene, tetrahydrofuran, dioxane, dimethylsulfoxide, dimethylformamide, dimethyl ether of ethylene glycol, etc. The reaction is preferably carried out without a catalyst, but frequently it is desirable to increase the reaction rate by the use of a basic catalyst. Bases that can be used as catalysts for the reaction are tertiary amines such as triethylenediamine, triethylamine, etc.; alkoxides such as sodium methoxide, potassium tert.-butoxide, etc.; and other such bases. The addition of these catalysts greatly increases the reaction rates but can also lead to partial cross-linking of the polymer. The degree of cross-linking will depend on the type of base used as the catalyst, its concentration, the reaction temperature, and the nature of the diluent if one is used. The cross-linking arises from the reaction of the cyclic anhydride with the epoxy groups, which is catalyzed by a base and which does not occur at all without a base. Therefore, if a linear, non-cross-linked polymer is desired, it is best to use no catalyst in the reaction. In cases where a small amount of cross-linking is not objectionable, a basic catalyst can be used; but the level of catalyst should be held below about 2% based on the total reaction mixture. Thus, the amount of the basic catalyst used can vary from a trace or catalytic amount up to about 2% of the mixture of reactants, but preferably will be from about 0.01% to about 0.1%.

In the case of the ethylenically unsaturated cyclic anhydrides such as maleic acid, the reaction is preferably carried out in an inert atmosphere, e.g. nitrogen, to avoid undesirable side reactions. Polymerization inhibitors such as cuprous chloride, copper dust, etc., may also be added.

The polyester polyols produced in accordance with this invention vary from heavy oils to solids, depending on the type of cyclic anhydride and epoxy alcohol used and also depending on the degree of polymerization. These cyclic anhydride-epoxy alcohol copolymers can be cross-linked with di- or polyisocyanates to produce clear, hard, insoluble films. This cross-linking may be done in the presence of a blowing agent as, for example, carbon dioxide, low-boiling fluorocarbon compounds, or low-boiling hydrocarbons, etc., whereby hard, light-weight, insoluble polyurethane foams are obtained. Such films and foams produced from the copolymers of a polyhalogenated cyclic anhydride as, for example, tetrachlorophthalic anhydride or 1,4,5,6,7,7-hexachlorobicyclo-[2.2.1]-5-heptene-2,3-dicarboxylic acid anhydride, etc., are especially useful as flame-retardant or flame-resistant materials.

In the case of copolymers prepared from ethylenically unsaturated cyclic anhydrides such as maleic anhydride, the copolymer can also be cross-linked through the double bond in the presence of a peroxide catalyst either alone or with other ethylenically unsaturated monomers, such as styrene or any other vinyl monomer to form insoluble films.

In some uses the presence of any carboxylic acid end groups in the polymer is undesirable. In such a case, these carboxylic acid groups may be converted into hydroxyalkyl esters of the copolymer by reacting the copolymer with an epoxide such as ethylene oxide, propylene oxide, epichlorohydrin, etc., so that the final copolymer is a neutral product.

The following examples will illustrate the process of producing the new polyesterpolyalcohol copolymers of this invention. All parts and percentages are by weight unless otherwise indicated.

*Example 1*

Six (6.0) parts of o-phthalic anhydride was finely ground and mixed with 12.0 parts of 9,10-epoxy octadecanol and 9.5 parts of the dimethyl ether of diethylene glycol as a solvent. The reaction mixture was heated to 150° C. for 2 hours. Then the solvent was removed by distillation. Thirteen and one-tenth (13.1) parts clear, colorless resin which was soluble in tetrahydrofuran was obtained. Analysis of the phthalic anhydride-9,10-epoxy octadecanol copolymer so obtained showed it to have an Acid No. of 5.6, an Ester No. of 207.7, and a Hydroxyl No. of 127.2.

*Example 2*

Seven and four-tenths (7.4) parts of o-phthalic anhydride and 14.2 parts of 9,10-epoxy octadecanol were placed in a mortar and mixed through by grinding. Then the mixture was heated under nitrogen to 110° C. for 16 hours. A clear, free-flowing heavy oil, which was soluble in tetrahydrofuran, was obtained. Analysis of the phthalic anhydride-9,10-epoxy octadecanol copolymer so obtained showed it to have an Acid No. of 38.9, an Ester No. of 216.9, a Hydroxyl No. of 93.2, and a molecular weight of 5693.

*Example 3*

Five (5.0) parts of 10,11-epoxy undecanol, 3.95 parts of o-phthalic anhydride, and 9.5 parts of dimethylformamide were mixed and heated to 155° C. for 16 hours. Then the solvent was removed by stripping. An off-white heavy oil was obtained as the product. Analysis of the phthalic anhydride-10,11-epoxy undecanol copolymer so obtained showed it to have an Acid No. of 33.8, an Ester No. of 265.7, and a Hydroxyl No. of 329.2.

*Example 4*

Five (5.0) parts of 10,11-epoxy undecanol, 3.95 parts of phthalic anhydride, and 0.1 part of potassium tert.-butoxide were dissolved in 8.9 parts of tetrahydrofuran. The solution was kept at 60° C. for 60 hours. Then the solvent was removed under reduced pressure. A soft, white, tacky wax was obtained as the produce. Analysis of the phthalic anhydride-10,11-epoxy undecanol copolymer so obtained showed it to have an Acid No. of 23.7, an Ester No. of 293.5 and a Hydroxyl No. of 269.3.

*Example 5*

Four and nine-tenths (4.9) parts of maleic anhydride and 14.2 parts of 9,10-epoxy octadecanol were mixed thoroughly. The mixture was heated to 95° C. with stirring under nitrogen for 3 hours. The product was a clear, resinous oil. Analysis of the maleic anhydride-9,10-epoxy octadecanol copolymer so obtained showed that it had an Acid No. of 48.3, an Ester No. of 233.6, a Hydroxyl No. of 108.7, and a molecular weight of 3000.

*Example 6*

One and ninety-six hundredths (1.96) parts of maleic anhydride and 5.68 parts of 9,10-epoxy octadecanol were mixed thoroughly by grinding in a mortar. Then the mixture was placed in a closed vessel under nitrogen and heated to 120° C. for 5 hours. A clear, extremely heavy oil was obtained as a product. Analysis of the maleic anhydride-9,10-epoxy octadecanol copolymer so obtained showed that it had an Acid No. of 54.4, an Ester No. of 271.7, a Hydroxyl No. of 101.7 and 0.21% oxirane.

*Example 7*

Five (5.0) parts of 10,11-epoxy undecanol and 2.60 parts of maleic anhydride were dissolved in 13.3 parts of tetrahydrofuran. This solution was heated to 60° C. for 40 hours. Then the solvent was removed under reduced pressure. A clear, off-white oil was obtained as a product. Analysis of the maleic anhydride-10,11-epoxy undecanol copolymer so obtained showed that it had an Acid No. of 77.8, an Ester No. of 216.5, and a Hydroxy No. of 200.

*Example 8*

Five (5.0) parts of 10,11-epoxy undecanol and 2.6 parts of maleic anhydride were dissolved in 9.5 parts of dimethylformamide. The solution was heated to 155° C. for 16 hours under nitrogen. Then the solvent was removed under reduced pressure. A tan, heavy oil was obtained as a product. Analysis of the maleic anhydride-10,11-epoxy undecanol copolymer so obtained showed that it had an Acid No. of 26.6, an Ester No. of 298.6, and a Hydroxyl No. of 171.

*Example 9*

Nine and two-tenths (9.2) parts of 1,4,5,6,7,7-hexachlorobicyclo-[2.2.1]-5-heptene-2,3-dicarboxylic acid anhydride and 7.1 parts of 9,10-epoxy octadecanol were mixed with 10 parts of toluene as a solvent. The reaction mixture was heated at 150° C. for 2 hours, after which the solvent was removed. The polymer so obtained was a wax-like solid which was soluble in methyl isobutyl ketone, tetrahydrofuran, and dimethyl sulfoxide. When tested for flammability, it was self-extinguishing.

*Example 10*

This example illustrates the cross-linking of the cyclic anhydride-epoxy alcohol copolymers with a diisocyanate. One and fifteen hundredths (1.15) parts of phthalic anhydride-9,10-epoxy octadecanol copolymer (made in Example 1) was dissolved in 8.9 parts of tetrahydrofuran. Then 0.20 part of toluene diisocyanate was added. The solution was stirred until homogenous, and then a film was cast on a glass plate. The film was cured for one hour at 120° C. A hard, clear film was obtained which was unaffected by immersion in methyl isobutyl ketone or tetrahydrofuran.

*Example 11*

This example illustrates the cross-linking of an unsaturated cyclic anhydride-epoxy alcohol copolymer with a vinyl monomer.

Two (2.0) parts of maleic anhydride-9,10-epoxy octadecanol copolymer (as prepared in Example 6), 0.45 part of styrene, and 0.01 part of benzoyl peroxide (catalyst) were mixed and placed under nitrogen. After heating to 85° C. for 6 hours, a clear, slightly elastic solid was obtained as a product. The product was insoluble in methyl isobutyl ketone.

*Example 12*

This example illustrates the preparation of a polyurethane foam from a cyclic anhydride-epoxy alcohol copolymer.

Twenty (20.0) parts of phthalic anhydride-9,10-epoxy octadecanol copolymer and 3 drops of a commercial silicone oil as a surfactant were mixed at room temperature and with stirring 11.0 parts of toluene diisocyanate was added. The mixture was stirred at 60° C. for 10 minutes. Then 0.50 part of distilled water containing 54 mg. triethylenediamine was added in one portion. The mixture was stirred vigorously for another 10 seconds and then allowed to foam. A fine cellular foam was obtained which was allowed to cure at room temperature for 20 hours. The hard, somewhat brittle foam had a density of ca. 10 lbs./cu. ft. and was insoluble in solvents such as methyl isobutyl ketone, tetrahydrofuran or methanol.

What I claim and desire to protect by Letters Patent is:

1. As a new composition of matter, a polyester of a cyclic anhydride of a dicarboxylic acid and an epoxy alcohol having the general formula:

$$A \left[ \begin{matrix} O & & O \\ \| & & \| \\ C-X-C-O-Y-O \end{matrix} \right]_x \begin{matrix} O & & O \\ \| & & \| \\ C-X-C-B \end{matrix}$$

where A is selected from the group consisting of HO— and

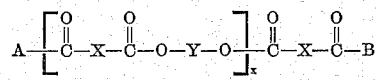

B is selected from the group consisting of —OH and

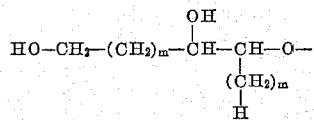

X is a divalent organic residue, Y is selected from the group consisting of

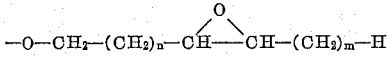

and

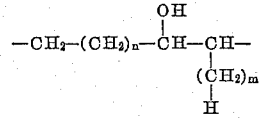

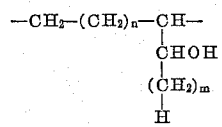

$n$ and $m$ are each any whole number of from 0 to 10 and the sum of $m+n$ is 7 to 14; and $x$ is an integer of at least one.

2. The product of claim 1 wherein the cyclic anhydride is maleic acid anhydride.

3. The product of claim 1 wherein the cyclic anhydride is phthalic acid anhydride.

4. The product of claim 1 wherein the cyclic anhydride is 1,4,5,6,7,7-hexachlorobicyclo-[2.2.1]-5-heptene-2,3-dicarboxylic acid anhydride.

5. The product of claim 2 wherein the epoxy alcohol is 9,10-epoxy octadecanol.

6. The product of claim 3 wherein the epoxy alcohol is 9,10-epoxy octadecanol.

7. The product of claim 4 wherein the epoxy alcohol is 9,10-epoxy octadecanol.

8. The product of claim 2 wherein the epoxy alcohol is 10,11-epoxy undecanol.

9. The product of claim 3 wherein the epoxy alcohol is 10,11-epoxy undecanol.

References Cited by the Examiner

UNITED STATES PATENTS

| | | | |
|---|---|---|---|
| 2,761,870 | 9/1956 | Payne et al. | 260—78.4 |
| 3,073,804 | 1/1963 | Raecke et al. | 260—78.4 |

OTHER REFERENCES

Paquin: "Epoxydoubindunger and Epoxylharze," 1958, page 538 relied on.

JOSEPH L. SCHOFER, *Primary Examiner.*

L. WOLFE, *Assistant Examiner.*